United States Patent
Zimmermann et al.

(10) Patent No.: US 7,170,694 B2
(45) Date of Patent: Jan. 30, 2007

(54) MAGNETICALLY POSITIONED PRECISION HOLDER FOR OPTICAL COMPONENTS

(75) Inventors: Heinz Zimmermann, Balgach (CH);
Harald Schnitzler, Luechingen (CH);
Klaus-Peter Zimmer, Heerbrugg (CH)

(73) Assignee: Leica Microsystems AG (Schweiz), Heerbrugg (CH)

( * ) Notice: Subject to any disclaimer, the term of this patent is extended or adjusted under 35 U.S.C. 154(b) by 611 days.

(21) Appl. No.: 10/696,719

(22) Filed: Oct. 29, 2003

(65) Prior Publication Data

US 2004/0085629 A1    May 6, 2004

(30) Foreign Application Priority Data

Nov. 1, 2002   (DE) ................. 102 51 379

(51) Int. Cl.
*G02B 7/02* (2006.01)
*G02B 21/00* (2006.01)

(52) U.S. Cl. ............ 359/813; 359/814; 359/821; 359/822; 359/824; 359/381

(58) Field of Classification Search .......... 359/813, 359/814, 819, 821, 822, 824, 831, 871, 381, 359/391, 393, 394; 356/39, 40, 136, 137, 356/244; 248/206.5, 476
See application file for complete search history.

(56) References Cited

U.S. PATENT DOCUMENTS 4,067,648 A * 1/1978 Spreitzer ............... 353/27 R
4,307,940 A * 12/1981 Hagedorn-Olsen .......... 359/821
5,177,640 A * 1/1993 Grassens ................. 359/814
5,617,260 A * 4/1997 McNiven et al. ........... 359/821
5,638,222 A * 6/1997 Shigehara ................. 359/814
5,815,328 A * 9/1998 Makita ..................... 359/824
6,322,223 B1  11/2001 Smith et al. .............. 359/871
6,480,347 B1 * 11/2002 Spring ...................... 359/831

FOREIGN PATENT DOCUMENTS

| DE | 1972374 | 11/1967 |
|----|---------|---------|
| DE | 3630632 | 9/1987 |
| DE | 19723744 | 1/1998 |
| DE | 19702754 | 7/1998 |
| DE | 20001763 U1 | 5/2000 |
| DE | 10000763 | 9/2000 |

* cited by examiner

*Primary Examiner*—Loha Ben
(74) *Attorney, Agent, or Firm*—Simpson & Simpson, PLLC

(57) ABSTRACT

A magnetically positioned precision holder for optical components in an optical device comprises a carrier for replaceably holding at least one optical component. The carrier is arranged in positionally adjustable fashion in a housing recess including a precision stop surface. Magnet pairs (A1/A2 and B1/B2) are oriented with identical polarity being provided in order to achieve a continuous contact pressure of the carrier (2; 3) against the stop surface (6), in such a way that the one magnet (A1, B1) is located in the recess and the corresponding magnet (A2, B2) is located in the carrier. The use of identically poled magnet pairs for movable precision holders and for precision positioning systems is also proposed.

19 Claims, 3 Drawing Sheets

MAGNETICALLY POSITIONED PRECISION HOLDER FOR OPTICAL COMPONENTS

CROSS REFERENCE TO RELATED APPLICATIONS

This application claims priority of the German Patent Application No. 102 51 379.1., filed on Nov. 1, 2002, which is incorporated by reference herein.

FIELD OF THE INVENTION

The application concerns magnetically positioned precision holders for optical components in an optical device.

BACKGROUND OF THE INVENTION

In optical devices, for example in microscopes, there exists the need for the operator to introduce into the optical device, or remove from it, optical components such as mirrors, beam splitters, filters, lenses, gratings, prisms, or diodes, and to replace them with a different component from a series of available components, in which context the component must be positioned very precisely in the working position.

Sliders are known on which an optical component, e.g. a dielectric beam splitter, which can be introduced by the device user selectably into the beam path, is arranged. If that component is to be switched in only temporarily, a long slider having a first use position (called the "working position"') and a second "parked position" in which the optical component is not effective, is advantageous. The component is switched by replacing the slider. The use position and parked position in the sliding direction are identified by a stop or detent. If one optical component of a series of possible ones is to be introduced into the beam path, sliders having components arranged next to one another, or wheels having components arranged circularly, are advantageous. In a situation with multiple components, a usable position in the sliding or rotational direction is identified by detents. Exact positioning in the beam path outside the sliding plane or rotational plane of the component being used is implemented, for example, by means of a precision dovetail guide or by pressure with a spring force against a reference surface.

DE-A1-197 02 754 discloses a filter switcher for microscopes, a filter mount being provided that is held reproducibly on a filter wheel by mechanical or magnetic auxiliary means. No information is provided as to the concrete nature and manner of operation of this magnetic holder, or its positioning on the filter wheel.

An objective turret for microscopes is evident from DE-A1-36 30 632. In order to mark various working positions, magnets that coact, or communicate, with magnetic field sensors for code recognition are attached to the turret shell.

US-B1-6 322 223 discloses optical components that are pre-installed on circular plates and can be positioned on a baseplate. Mechanical elevations on the underside of these sector plates coact with cylindrical element so as to make possible accurately oriented positioning on the circular plate. In addition, magnets are recessed into the sector plates and the baseplate. For example, one magnet corresponds with its north pole to a corresponding magnet with its south pole. Differently poled magnets are recessed on the baseplate. The result is that, in order to prevent transposition or incorrect orientation, each of the four sector plates can be placed at only one specific location on the baseplate. The approach of using identically poled magnets for deliberate repulsion operations is not evident from this document.

Also known, from DE-A1-197 23 74, is a laser cutting head that is attached to an upper housing by means of a magnetic holder. In the event of unintentional damage to the cutting head, this magnetic holder can function, so to speak, as a "defined break point"; in other words, the device can be deliberately pushed away from the housing. The type of magnetic holder is not discussed further; it can be assumed that it is an annular magnetic contact surface. Here as well, oppositely poled magnetic regions coact.

DE-U 1-200 01 763 describes a pair of eyeglasses or a mask that comprises a magnetic holder. The document depicts a front cover for a pair of eyeglasses and an eyeglass support element, the two detachably joined to one another by means of a groove-spring connection and said magnetic holder.

Lastly, W. Krause, "Konstruktionselemente der Feinmechanik" [Structural elements for precision engineering], VEB Verlag Technik, Berlin, 1st ed. 1989, pp. 450 and 451, discloses a magnetic detent system, the individual detent positions of a disk being secured in non-contact fashion.

The following aspects of this existing art are disadvantageous:

A dovetail guide can be produced only using complex manufacturing methods, since it requires close tolerances so that the component can be moved but nevertheless has no play. Pressing the component against a reference surface using a spring requires careful tuning of the spring force, and results in wear on both contact surfaces as a result of the pressure.

A magnetic holder using only one magnet, which is mounted either on the housing or on the displaceable part, has the disadvantage that in the usable position, magnetizable materials must be present opposite the magnet so that the magnetic force can act there; and no magnetizable materials must be used outside of that position, so that displacement is possible. With long sliders, the force of one magnet is often not sufficient to hold the slider in engagement against the reference surface. As a special instance of magnetizable materials, one or more magnets can also be mounted both on the housing and on the displaceable part so that they attract one another in a usable position. Mutually attracting magnets have the disadvantage, however, that they must be arranged above and below the reference surface and that, because they require space on either side of the reference surface, they can touch the beam path.

SUMMARY OF THE INVENTION

It is therefore the object of the present invention to describe a precision holder of the kind cited above which does not have the disadvantages of known solutions and in which wear-free and precise retention of movable carriers of optical components for optical devices is achieved. This object is achieved by the present invention.

BRIEF DESCRIPTION OF THE DRAWINGS

The invention will be explained in more detail below with reference to drawings in which:

FIG. 1b is a sectional view taken generally along line X—X of FIG. 1a;

FIG. 3b is a sectional view taken generally along line Y—Y of FIG. 3a; and,

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed embodiments.

Figure 1A:
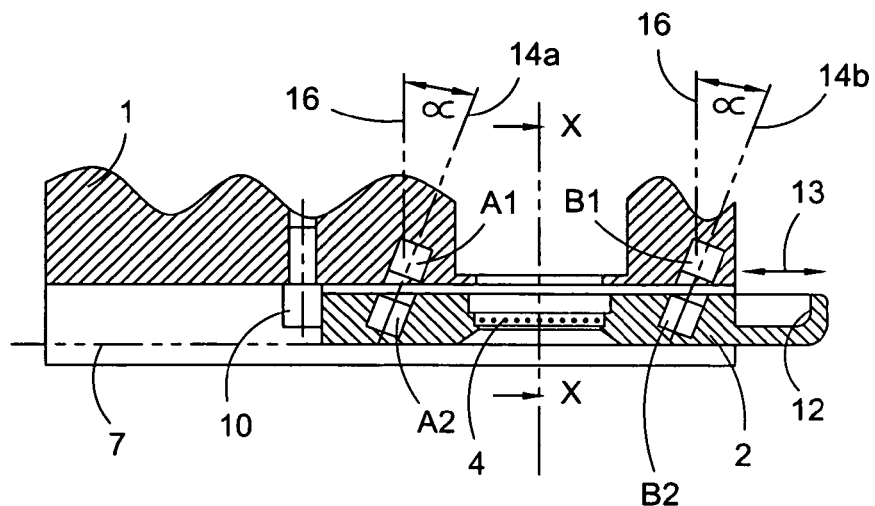
FIG. 1a is a lateral sectional view of a first embodiment of the magnetic holder according to the present invention, for a pull-out carrier.
Figure 1B:
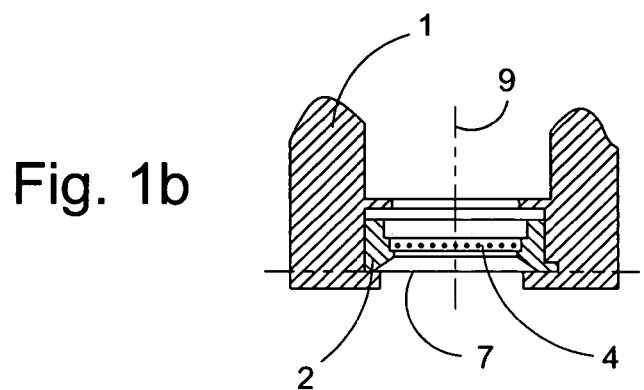
Figure 2:
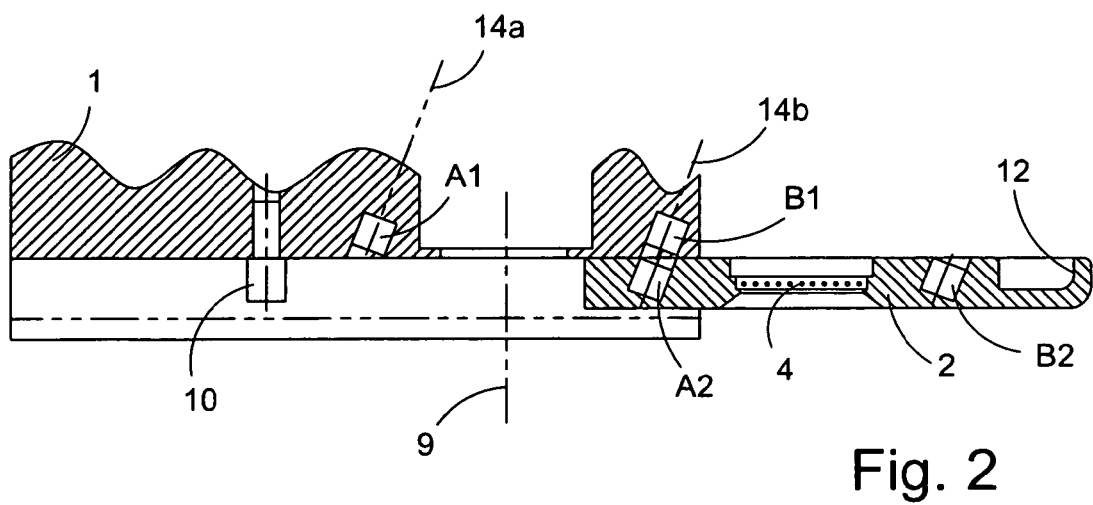
FIG. 2 is similar to FIG. 1a, but illustrates the carrier in a pulled out ("parked position")

FIG. 1a illustrates housing 1 for an optical device, for example a microscope. The housing comprises an insertion channel for linear carrier 2, for example a slider. By means of a handle 12, the linear carrier can be pushed into housing 1 as far as stop 10. An optical component 4, for example a filter or a lens, is located in linear carrier 2. FIG. 1a depicts a "working position" of optical component 4 in the device. In the depiction shown, optical axis 9 of optical component 4, like the entire device in this region, extends vertically. The underside of linear carrier 2 is in contact with housing 1 on a precision displacement surface 6 and can be displaced as indicated by double arrow 13. FIG. 2 shows what is depicted in FIG. 1a, but carrier 2 is partly pulled out of housing 1 to the "parked position" for optical component 4.

Magnets A2 and B2 are located in carrier 2 on each side of optical component 4. Magnets A2 and B2 are permanent magnets and are oriented such that the south pole of A2 and the north pole of B2 are directed upward in FIGS. 1a and 2.

Magnets A1 and B1 are likewise present in housing 1, A1 being on the one hand associated with magnet A2, and B1 on the other hand associated with magnet B2. According to the present invention, however, the magnetic orientations of A1 and B1 are such that on the one hand the south pole of A1 faces the south pole of A2, and on the other hand the north pole of B1 faces the north pole of B2. This results in two mutually corresponding magnet pairs A1/A2 and B1/B2; this "correspondence" results not (as is generally known) in an attractive action, but rather in a continuous repulsion action. The effect of these magnet pairs A1/A2 and B1/B2 oriented with identical polarity is thus used, according to the present invention, to press carrier 2 continuously against reference plane 7 in the working position and thus to ensure precise positioning for optical component 4 in housing 1.

The reason for using magnet pairs A1/A2 and B1/B2 positioned on either side of optical component 4 is to generate a "large-area" pressure against a reference plane 7, as opposed to a "single-point" pressure.

It is also within the context of the present invention to arrange the corresponding magnets, so to speak, "diagonally," providing one stop or two stops offset at an angle in order to ensure precise positioning in two or three spatial directions.

If precise positioning in two spatial directions is implemented, angle α is determined in the plane spanned by vertical 16 and translation direction 13 of carrier 2.

If precise positioning in three spatial directions is implemented, angle α is measured in a plane that contains vertical 16 and is at an angle of approximately 45° to translation direction 13 of carrier 2.

FIG. 2 shows the "parked position" for optical component 4 in the pulled-out carrier 2. Optical component 4 is located outside optical axis 9, i.e., outside the working position. This position of carrier 2 could be used, for example, to replace optical component 4 with a different type of optical component, so as to subsequently either to bring it into the working position by sliding carrier 2 into housing 1 as far as stop 10, or to introduce optical component 4 into the beam path (symbolized by optical axis 9) only when needed.

The juxtaposition of magnets B1/A2 in the parked position results in another aspect of the invention. Magnet pair B1/A2 is now positioned with opposite polarity, since the north pole of B1 corresponds to the south pole of A2. The desired result is therefore a mutual attraction, resulting in a magnetic interlock that prevents carrier 2 from unintentionally falling or being pulled out of housing 1.

As is further evident from FIG. 1a, it may be advantageous to position magnet pairs A1/A2 and B1/B2 that coact with each other, and to align them with one another, in such a way that axis 14a of A1 is lined up with the corresponding axis of A2 and moreover forms an angle α with a vertical 16 that is perpendicular to reference plane 7, i.e. to the translation direction of carrier 2 in housing 1. Angle α can advantageously lie within the range 0<α<45°. Tilting of axis 14a, i.e. selection of an angle α>0, results in an additional directional component of the repulsive compression force toward stop 10. In more general terms, it can be stated that the connecting line of the identically poled magnetic poles associated with one another, i.e., for example the south poles of A1 and A2 or the north poles of B1 and B2, is intended to have a pressing component toward stop 10, or toward those stops that have already been explained above in connection with the implementation of precise positioning in two spatial directions.

Figure 3A:
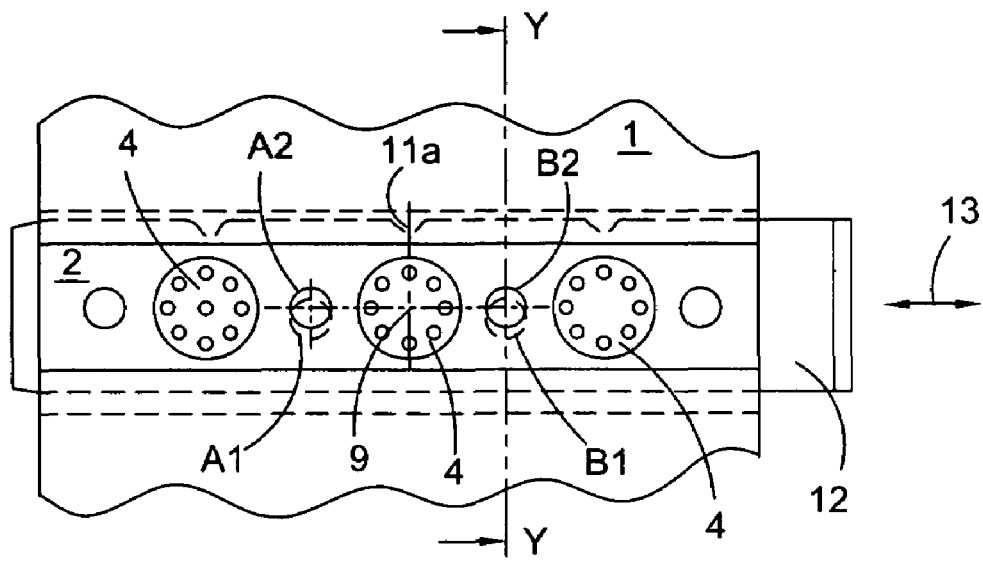
FIG. 3a is a plan view of a second embodiment of the magnetic holder, with the magnet pairs positioned differently.

FIG. 3a depicts a linear carrier 2 in the form of a switching slider that contains three optical components 4, the center one of which is in the working position. This is illustrated by the indication of optical axis 9. Located on the one side of carrier 2 are detents 11a, i.e., notches that correspond to an appropriate detent lug on housing 1. Located on either side of each optical component 4 are magnets A2 and B2 whose respective polarities (i.e. magnetic orientations) are all identically oriented. Magnet pairs A2/A1 and B2/B1 are once again evident, magnets A1 and B1 being depicted with dashed lines and arranged below the drawing plane. In this exemplary embodiment, however, unlike in FIG. 1a, the axis orientations of the two magnet pairs A2/A1 and B2/B1 are offset in parallel fashion (cf. FIG. 3b, which depicts a section along line Y—Y of FIG. 3a). This variation of the spatial associations of the mutually corresponding identically poled magnet pairs also results in a correspondingly directed additional action of the overall repulsion force toward detent 11a.

Figure 3B:
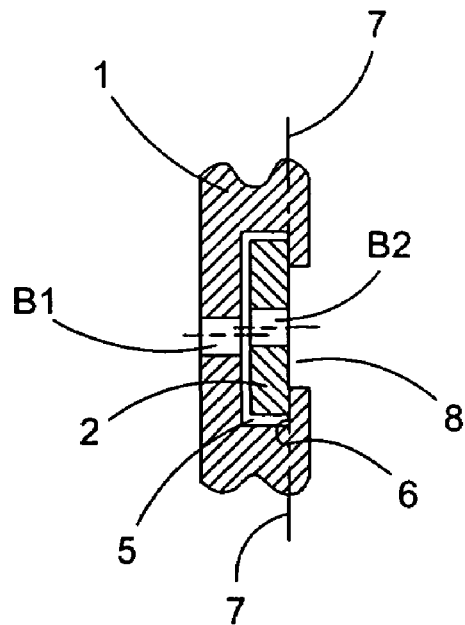

FIG. 3b shows recess 5, which is considerably larger, especially in terms of its depth, than carrier 2 that is to be inserted. Magnet pair B1/B2 exerts its repulsive force and presses the one side of the carrier against inner precision stop surface 6, which constitutes reference plane 7.

Figure 4:
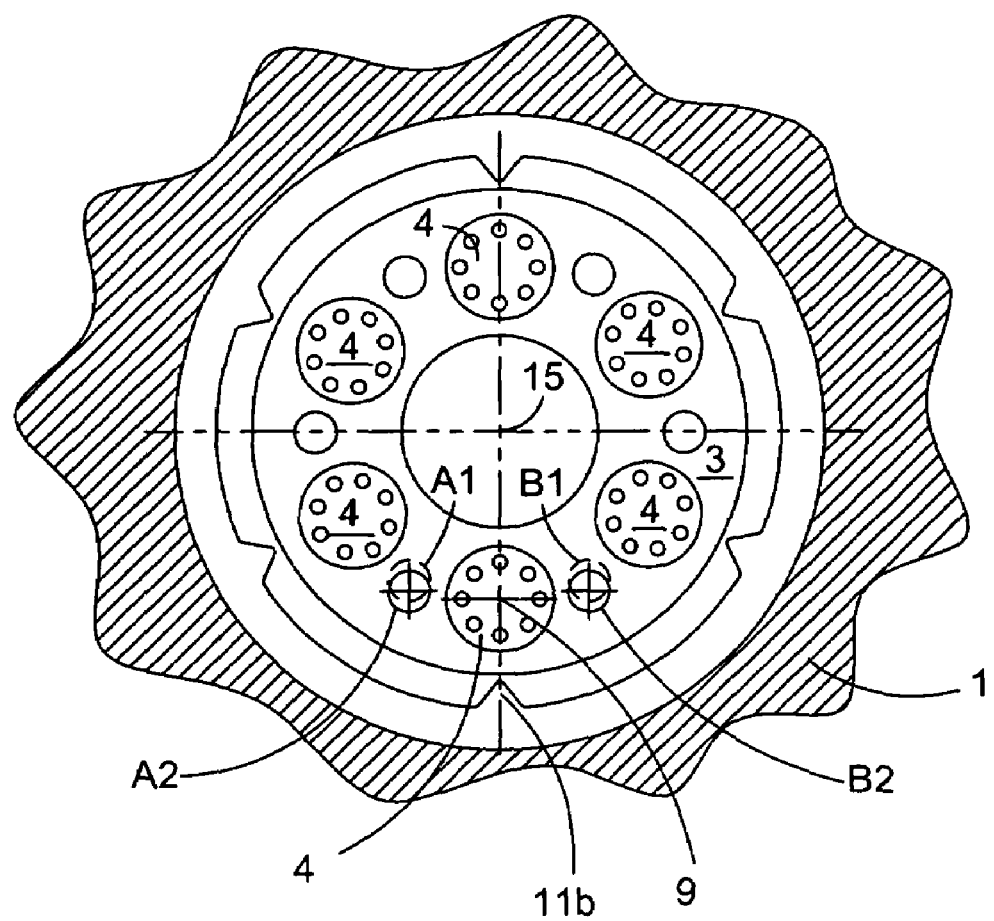
FIG. 4 is a plan view of a third embodiment of the magnetic holder, having a rotary carrier for the optical components.

FIG. 4 depicts a rotary carrier 3 that is embodied as a circular disk. It contains six optical components 4, optical component 4 located in the working position being identified by its optical axis 9. The filter wheel itself has six peripherally arranged detent notches. It is evident that the particular detent notch associated with optical component 4 that is in the working position is in engagement with a corresponding detent lug. For simplicity's sake, in this application the detent notch(es) and detent lug are referred to together as detent 11b (FIG. 4) or detent 11a (FIG. 3a). It is apparent from FIG. 4 that the detent lug is arranged on the cylindrical inner wall of housing 1. Carrier 3 is mounted rotationally about an axis 15.

Optical components 4 and magnets A1, B2 etc. positioned therebetween lie with their respective centers on a circular line, the penetration point of axis 15 through the drawing plane of FIG. 4 representing the center point of that notional circular line.

The eccentricity, visible in FIG. 4, of the position of axis 15 with respect to the axis (not depicted) of cylindrical housing 1 is conditioned, in terms of design, by the fact that when catch 11 needs to be released, i.e. upon departure from the detent position for component 4 shown in FIG. 4, a deflection of the disk-shaped carrier 3 in the diametrical direction becomes unavoidable. It is apparent from this that axis 15 is not fixed in stationary fashion within housing 1.

Although two embodiments of carriers (linear switching slider; disk-shaped carrier), which according to the present invention hold a plurality of optical components and can be brought into a precise working position within an optical device, have been described in detail in order to explain the present invention, other carriers, for example those having a nonlinear longitudinal extension or a conical three-dimensional turret shape or a serial arrangement of cube-shaped optical components similar to chain links, are of course also encompassed by the concept of the present invention. There is also, in principle, no limitation to specific types in terms of the selection of specific magnetic materials (e.g. neodymium) or magnet configurations (e.g. square or polygonal magnet sections) or magnet types (e.g. including electromagnets).

Parts List
1 Housing
2 Linear carrier (slider)
3 Rotary carrier (wheel)
4 Optical component(s)
5 Recess in (1)
6 Inner precision stop surface of (5)
7 Reference plane
8 Opening
9 Optical axis of optical component (4) in working position
10 Stop for (2)
11a Detent for (2)
11b Detent for (3)
12 Handle for (2)
13 Double arrow: translation directions for (2)
14a Axis of (A1)
14b Axes of (B1)
15 Axes of (3)
16 Vertical, perpendicular to (7)
17 Lug on (1)
A1, B1 Magnet(s) in (1)
A2, B2 Magnet(s) in (2) and (3)
α Angle between axis (14a or 14b) of a magnet (A1, A2, B1, B2) and a vertical (16) encountering reference plane (7) at a right angle

What is claimed is:

1. A magnetically positioned precision holder for at least one optical component in an optical device,
wherein a carrier (2; 3) holding at least one optical component (4) is arranged in positionally adjustable fashion in a housing recess (5) having a precision stop surface (6), magnet pairs (A1/A2 and B1/B2) oriented with identical polarity being arranged, in order to achieve a contact pressure of the carrier (2; 3) against the stop surface (6), in such a way that at least one magnet (A1, B1) is located in the wall of the recess (5) and a corresponding magnet (A2, B2) in the carrier (2; 3).

2. The precision holder as defined in claim 1, wherein the at least one optical component is held replaceably in the carrier (2; 3).

3. The precision holder as defined in claim 1, wherein the recess (5) is larger than the space requirement of the carrier (2; 3) and is deeper than the thickness of the carrier (2; 3).

4. The precision holder as defined in claim 1 wherein the stop surface (6) for an upper side of the carrier (2; 3) constitutes a reference plane (7) for precise positioning of the optical component (4) in the housing (1) of the device.

5. The precision holder as defined in claim 1 wherein axes of the magnets belonging to a magnet pair (A1/A2 and B1/B2) line up with one another.

6. The precision holder as defined in claim 1, wherein axes of the magnets belonging to a magnet pair (A1/A2 and B1/B2) are offset in parallel fashion from one another.

7. The precision holder as defined in claim 1, wherein axes of the magnets belonging to a magnet pair (A1/A2 and B1/B2) form an angle α with a vertical (16) that is at an angle of 90 degrees to a reference plane (7).

8. The precision holder as defined in claim 1, wherein the optical component (4) located in the a working position is surrounded on the carrier (2; 3) by two magnets (A2, B2) of different polarity.

9. The precision holder as defined in claim 8, wherein the magnets (A2, B2) and the optical component (4) are arranged on the a linear carrier (2) along a line that corresponds to its translation direction (13).

10. The precision holder as defined in claim 8, wherein the magnets (A2, B2) and the optical component (4) are arranged on a carrier wheel (3) along a circular line that corresponds to its rotational motion direction about an axis (15).

11. The precision holder as defined in claim 1, wherein the carrier (2; 3) comprises a detent notch (11a, 11b) for each optical component (4).

12. The precision holder as defined in claim 1, wherein the carrier (2) comprises a handle (12) on its one longitudinal side; and the other longitudinal side contacts a device stop (10) when the optical component (4) is in a working position.

13. The precision holder as defined in claim 1, wherein for implementation of a parked position of the carrier (2), the latter can be pulled out of the housing (1) sufficiently that a magnet (A2) corresponds to another magnet (B1) to form an oppositely poled magnet pair (A2/B1).

14. A method for magnetically positioning a holder for at least one optical component in an optical device comprising:
providing a carrier for holding at least one optical component in positionally adjustable fashion in a housing recess, said housing recess comprising a stop surface,
providing magnet pairs (A1/A2 and B1/B2) in said recess and said carrier, said magnet pairs operatively arranged to repel one another and bias said carrier against said stop surface.

15. The method of claim 14 wherein a first magnet (A1, B1) of said magnet pairs is operatively arranged in a wall of said recess (5) and a second magnet (A2, B2) of said magnet pairs operatively arranged in said carrier.

16. The method of claim 14 further comprising means for positioning said at least one optical component in a working position.

17. A holder for at least one optical component in an optical device, said holder comprising:
   a carrier operatively arranged to secure at least one optical component; said carrier positionally adjustable in a housing recess, said housing recess comprising a stop surface,
   magnet pairs (A1/A2 and B1/B2) operatively arranged in said recess and said carrier, said magnet pairs operatively arranged to repel one another such that said carrier is biased against said stop surface.

18. The holder of claim 17 further comprising positioning means for laterally positioning said optical component in a working position.

19. The holder of claim 17 further comprising positioning means for rotationally positioning said optical component in a working position.

* * * * *